(12) United States Patent
Okamoto et al.

(10) Patent No.: US 9,453,327 B2
(45) Date of Patent: Sep. 27, 2016

(54) CONSTRUCTION MACHINE

(71) Applicant: Hitachi Construction Machinery Co., Ltd., Bunkyo-ku, Tokyo (JP)

(72) Inventors: Masaya Okamoto, Ushiku (JP); Shinya Abe, Tsuchiura (JP); Kousuke Nakajima, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/691,632

(22) Filed: Apr. 21, 2015

(65) Prior Publication Data

US 2015/0299983 A1    Oct. 22, 2015

(30) Foreign Application Priority Data

Apr. 22, 2014   (JP) ................................ 2014-087991

(51) Int. Cl.
| | |
|---|---|
| *E02F 9/08* | (2006.01) |
| *B62D 33/06* | (2006.01) |
| *B60K 13/04* | (2006.01) |
| *F01N 3/20* | (2006.01) |
| *E02F 9/16* | (2006.01) |

(52) U.S. Cl.
CPC ............. *E02F 9/0883* (2013.01); *B60K 13/04* (2013.01); *B62D 33/0617* (2013.01); *E02F 9/0808* (2013.01); *E02F 9/0833* (2013.01); *E02F 9/0866* (2013.01); *F01N 3/2066* (2013.01); *B60Y 2200/412* (2013.01); *E02F 9/0816* (2013.01); *E02F 9/16* (2013.01); *F01N 2590/08* (2013.01); *F01N 2610/02* (2013.01); *F01N 2610/1406* (2013.01); *Y02T 10/24* (2013.01)

(58) Field of Classification Search
CPC ... E02F 9/0883; E02F 9/0866; E02F 9/0808; E02F 9/0833; E02F 9/0816; E02F 9/16; B62D 33/0617; B60K 13/04; B60K 13/06; F01N 3/2066; F01N 2590/00; F01N 2590/08; F01N 2610/02; F01N 2610/1406; F01N 13/1822; F01N 2340/04; B60Y 2200/412
See application file for complete search history.

(56) References Cited

U.S. PATENT DOCUMENTS

| | | | | |
|---|---|---|---|---|
| 8,056,671 B2 * | 11/2011 | Ikegami | ............. | F01N 13/1822 180/309 |
| 8,186,156 B2 * | 5/2012 | Kamiya | ............. | B01D 53/9431 180/305 |

(Continued)

FOREIGN PATENT DOCUMENTS

JP          2011-11725 A       1/2011

*Primary Examiner* — J. Allen Shriver, II
*Assistant Examiner* — Brian Cassidy
(74) *Attorney, Agent, or Firm* — Crowell & Moring LLP

(57) ABSTRACT

A cab rear extension beam (14) that is positioned in a front side to a heat exchanger (26) to support a rear side of said cab (28) is provided. The cab rear extension beam (14) includes a rising plate part (14A) that rises from a bottom plate (6), an upper horizontal plate part (14B) that is bent from an upper end of the rising plate part (14A) and extends to the rear side, and a space part (14C) that is formed of the rising plate part (14A) and the upper horizontal plate part (14B), and is formed in a reverse L-letter shape as a whole. A urea water tank (34) is formed with a vertical tank part (35) that is positioned in a rear side and extends in an upper-lower direction and a lateral tank part (36) that extends from a lower part of the vertical tank part (35) to the front side, and is formed in an L-letter shaped vessel as a whole. Besides, the lateral tank part (36) of the urea water tank (34) is disposed in the space part (14C) in the cab rear extension beam (14).

5 Claims, 11 Drawing Sheets

(56) References Cited

U.S. PATENT DOCUMENTS

| | | | | |
|---|---|---|---|---|
| 8,276,370 | B2* | 10/2012 | Kamiya | B01D 53/9409 60/286 |
| 8,403,099 | B2* | 3/2013 | Yokota | B60K 15/063 180/309 |
| 8,459,014 | B2* | 6/2013 | Kamiya | B60K 13/04 60/295 |
| 8,573,646 | B2* | 11/2013 | Kamiya | B60K 13/04 180/89.2 |
| 8,672,082 | B2* | 3/2014 | Kashu | B60K 13/04 180/309 |
| 8,695,748 | B2* | 4/2014 | Togo | B60K 5/00 180/309 |
| 8,820,468 | B2* | 9/2014 | Sekiya | B60K 13/04 180/309 |
| 8,851,224 | B2* | 10/2014 | Hayashi | B60K 13/04 180/296 |
| 8,857,557 | B2* | 10/2014 | Sakamoto | B60K 11/04 180/296 |
| 8,985,262 | B2* | 3/2015 | Sekiya | B60K 13/04 180/309 |
| 8,997,915 | B2* | 4/2015 | Hayashi | B60K 13/04 180/296 |
| 9,027,697 | B2* | 5/2015 | Kobayashi | E02F 9/0875 180/296 |
| 9,033,081 | B1* | 5/2015 | Yamagoe | B60K 11/02 180/68.1 |
| 9,061,582 | B2* | 6/2015 | Sawada | B60K 13/04 180/309 |
| 9,217,236 | B2* | 12/2015 | Yamashita | F01N 3/2066 |
| 9,290,906 | B2* | 3/2016 | Kobayashi | E02F 9/0866 |
| 9,303,388 | B2* | 4/2016 | Mori | F01N 3/2066 |
| 9,309,643 | B2* | 4/2016 | Yamagoe | F01N 13/08 |
| 9,315,098 | B2* | 4/2016 | Lee | B60K 15/03519 |
| 2009/0101375 | A1* | 4/2009 | Tsukui | B62D 21/186 172/776 |
| 2010/0038162 | A1* | 2/2010 | Kamiya | B01D 53/9431 180/69.6 |
| 2012/0067661 | A1* | 3/2012 | Kashu | B60K 13/04 180/309 |
| 2013/0000281 | A1* | 1/2013 | Merchant | E02F 3/7609 60/295 |
| 2013/0071295 | A1* | 3/2013 | Terakawa | E02F 9/0858 422/168 |
| 2013/0145749 | A1* | 6/2013 | Merchant | F01N 3/2066 60/295 |
| 2013/0319787 | A1* | 12/2013 | Kobayashi | E02F 9/0866 180/309 |
| 2015/0000256 | A1* | 1/2015 | Kobayashi | F01N 3/10 60/282 |
| 2015/0001170 | A1* | 1/2015 | Terata | B01D 53/94 212/302 |
| 2015/0075894 | A1* | 3/2015 | Kamimae | E02F 9/0833 180/309 |
| 2015/0114505 | A1* | 4/2015 | Ryu | F01N 3/206 137/899 |
| 2015/0136514 | A1* | 5/2015 | Arai | E02F 3/764 180/309 |
| 2015/0192052 | A1* | 7/2015 | Ogawa | F01N 3/208 60/295 |
| 2015/0233089 | A1* | 8/2015 | Kamimae | E02F 9/0866 180/309 |
| 2015/0259878 | A1* | 9/2015 | Fujii | E02F 9/0875 180/309 |
| 2015/0299981 | A1* | 10/2015 | Hayashi | E02F 9/0866 180/309 |
| 2015/0306950 | A1* | 10/2015 | Sandou | E02F 9/0866 60/297 |
| 2015/0329146 | A1* | 11/2015 | Hirsch | B62D 21/20 296/203.01 |
| 2015/0337520 | A1* | 11/2015 | Yabe | E02F 3/3411 180/68.1 |
| 2015/0345352 | A1* | 12/2015 | Mitobe | F01N 3/20 60/282 |
| 2016/0010525 | A1* | 1/2016 | Sandou | A01D 41/12 60/301 |
| 2016/0017778 | A1* | 1/2016 | Sandou | A01D 41/12 60/297 |
| 2016/0024752 | A1* | 1/2016 | Mitsuda | E02F 9/0866 180/296 |
| 2016/0031313 | A1* | 2/2016 | Legueux | B60K 13/04 180/54.1 |
| 2016/0032562 | A1* | 2/2016 | Aoyama | B60R 3/00 180/68.3 |
| 2016/0040568 | A1* | 2/2016 | Sandou | F01N 3/2066 180/309 |
| 2016/0053645 | A1* | 2/2016 | Sandou | F01N 3/2066 60/301 |
| 2016/0082830 | A1* | 3/2016 | Okamura | F01N 3/2066 180/309 |
| 2016/0115840 | A1* | 4/2016 | Azuma | F01N 3/208 180/309 |

* cited by examiner

CONSTRUCTION MACHINE

TECHNICAL FIELD

The present invention relates to a construction machine such as a hydraulic excavator and the like provided with a NOx purifying device for removing nitrogen oxides in an exhaust gas, for example.

BACKGROUND ART

In general, a hydraulic excavator as a construction machine comprises an automotive lower traveling structure, an upper revolving structure that is rotatably mounted on the lower traveling structure, and a front device that is liftably mounted in a front part of the upper revolving structure. The front device is configured of a boom, an arm, a bucket and a plurality of hydraulic actuators composed of a boom cylinder, an arm cylinder and a bucket cylinder that drive the above components respectively. The front device actuates each of the hydraulic actuators to perform an excavating operation of earth and sand.

The upper revolving structure is provided with a revolving frame that is configured as a support structure, a counterweight that is positioned in a rear side of the revolving frame to act as a weight balance to the front device, an engine that is disposed on the revolving frame in a laterally-facing state to be positioned in a front side to the counterweight, a heat exchanger that is provided to be positioned in one side of the engine in a length direction, a cab that is provided on the revolving frame to be positioned in a front side to the heat exchanger, a NOx purifying device that is mounted in an exhaust pipe of the engine and is provided with a urea selective reduction catalyst for removing nitrogen oxides in an exhaust gas by injection of urea water from a urea water injection valve, and a urea water tank that reserves urea solution therein for supply to the urea water injection valve in the NOx purifying device.

Further, the revolving frame includes a flat bottom plate, left and right vertical plates that are provided vertically on the bottom plate at an interval in a left-right direction to extend in a front-rear direction, a plurality of extension beams that extend in the left-right direction from the bottom plate and the respective vertical plates, and a left side frame and a right side frame that are mounted in front ends of the respective extension beams to extend in the front-rear direction in outside positions of the bottom plate in the left-right direction (Patent Document 1).

PRIOR ART DOCUMENT

Patent Document

Patent Document 1: Japanese Patent Laid-Open No. 2011-11725 A

SUMMARY OF THE INVENTION

In the hydraulic excavator according to Patent Document 1, a urea water tank is disposed in a space part between a cab and a heat exchanger. On the other hand, in recent hydraulic excavators, the downsizing of the upper revolving structure is achieved in such a manner that the upper revolving structure does not make contact with obstacles in the surroundings at the revolving operation time of the upper revolving structure.

Therefore, since a large space part cannot be ensured between the cab and the heat exchanger in the small-sized hydraulic excavator with the downsized upper revolving structure, there is a problem that the volume of the urea water tank is made small.

In addition, when the space part for installing various kinds of equipment is made small, the urea water tank cannot be freely disposed because of the other equipment disposed in this space. As a result, in a case of performing a water supply work of the urea water to the urea water tank and a maintenance work of the urea water tank, a difficult work posture of an operator is sometimes required, leading to a problem of a reduction in workability of these works.

In view of the aforementioned problems in the conventional art, it is an object of the present invention to provide a construction machine that can enlarge the volume of a urea water tank even in a limited space, and improve water supply workability and maintenance workability of the urea water tank.

(1) A construction machine according to the present invention, comprises an automotive lower traveling structure; an upper revolving structure that is rotatably mounted on the lower traveling structure; and a front device that is liftably mounted in a front part of the upper revolving structure, wherein the upper revolving structure includes a revolving frame that is configured as a support structure, a counterweight that is positioned in a rear side to the revolving frame to act as a weight balance to the front device, an engine that is disposed on the revolving frame in a laterally-facing state to be positioned in a front side to the counterweight, a heat exchanger that is provided to be positioned in one side of the engine in a length direction, a cab that is provided on the revolving frame to be positioned in a front side to the heat exchanger, a NOx purifying device that is mounted in an exhaust pipe of the engine and is provided with a urea selective reduction catalyst for removing nitrogen oxides in an exhaust gas by injection of urea water from a urea water injection valve, and a urea water tank that reserves urea water therein for supply to the urea water injection valve in the NOx purifying device, wherein the revolving frame includes a flat bottom plate, left and right vertical plates that are provided vertically on the bottom plate at an interval in a left-right direction to extend in a front-rear direction, a plurality of extension beams that extend in the left-right direction from the bottom plate and the respective vertical plates, and a left side frame and a right side frame that are mounted in front ends of the respective extension beams to extend in the front-rear direction in outside positions of the bottom plate in the left-right direction.

In order to solve the aforementioned problems, a characteristic of a configuration adopted by the present invention is that a cab rear extension beam that is positioned in a front side to the heat exchanger to support a rear side of the cab among the plurality of the extension beams, is formed in a reverse L-letter shape with a rising plate part that rises from the bottom plate, an upper horizontal plate part that is bent from an upper end of the rising plate part and extends to the rear side, and a space part that is formed between the rising plate part and the upper horizontal plate part; the urea water tank is formed in an L-letter shaped vessel with a vertical tank part that extends in the upper-lower direction and a lateral tank part that extends from a lower part of the vertical tank part to the front side; and the lateral tank part in the urea water tank is disposed in the space part formed in the cab rear extension beam.

With this arrangement, the volume of the urea water tank can be increased by a size of the lateral tank part. In this case, the lateral tank part can be disposed using the space part of the cab rear extension beam formed in the reverse L-letter shape.

As a result, also in a case where the space for installing the urea water tank is small, the volume of the urea water tank can be increased using the space part as a dead space. Further, since a substantial occupation space of the urea water tank can be made small, degrees of freedom for the disposition location of the urea water tank can be increased. Therefore, since the urea water tank can be disposed in a position within easy reach from outside, it is possible to improve workability of the water supply work to the urea water tank, the maintenance work to the urea water tank, and the like.

(2) According to the present invention, a front partition plate is provided on an upper surface of the upper horizontal plate part of the cab rear extension beam to rise from the upper horizontal plate part and extend in the left-right direction, left and right rear part plates are provided between the left and right vertical plates and the left and right side frames respectively to extend in parallel to the extension beam, a rear partition plate that extends in the left-right direction is provided in the left rear part plate of the left and right rear part plates to face the front partition plate, a utility room is provided between the front partition plate and the rear partition plate to be positioned in a suction surface side where the heat exchanger sucks outside air, and the vertical tank part in the urea water tank is disposed in a front side position of the utility room.

With this arrangement, since the utility room is disposed in the suction surface side where the heat exchanger sucks the outside air, that is, in the outside position of the left-right direction, the vertical tank part in the urea water tank disposed in the utility room can be easily reached from outside. Therefore, it is possible to improve the workability of the water supply work to the urea water tank, the maintenance work to the urea water tank, and the like.

(3) According to the present invention, the upper horizontal plate part in the cab rear extension beam is provided with mount fixing holes positioned respectively in both sides of in the left-right direction to mount vibration isolating mounts that support the cab in a vibration isolating state, and the lateral tank part in the urea water tank is disposed in a position of avoiding each of the mount fixing holes in a plan view.

With this arrangement, the lateral tank part in the urea water tank can be disposed in the two mount fixing holes provided on the upper horizontal plate part in the cab rear extension beam, that is, in the position of avoiding each of the vibration isolating mounts. Therefore, the urea water tank can be disposed in a position of not interfering with each of the vibration isolating mounts disposed in the rear side of the cab.

(4) According to the present invention, an undercover is provided in a lower side to the cab rear extension beam to be positioned between the bottom plate and the left side frame, and the urea water tank is mounted on the undercover using a fixing tool. Therefore, the urea water tank uses the undercover to be able to be mounted on the undercover using the fixing tool. Thereby, the urea water tank can be easily fixed on the revolving frame.

(5) According to the present invention, the vertical tank part in the urea water tank extends upward along a rear surface of the cab, and a water supply port of urea water is provided on an upper part position of the vertical tank part.

Thereby, the urea water can be easily supplied to the urea water tank from the water supply port provided in the upper part position.

BRIEF DESCRIPTION OF THE DRAWINGS

FIG. 10 is a configuration diagram showing the configuration of a NOx purifying device together with an engine and the like.

MODE FOR CARRYING OUT THE INVENTION

Hereinafter, an embodiment of a construction machine according to the present invention will be in detail explained with reference to FIG. 1 to FIG. 10, by taking a wheel type hydraulic excavator provided with a wheel type lower traveling structure as an example.

Figure 1:
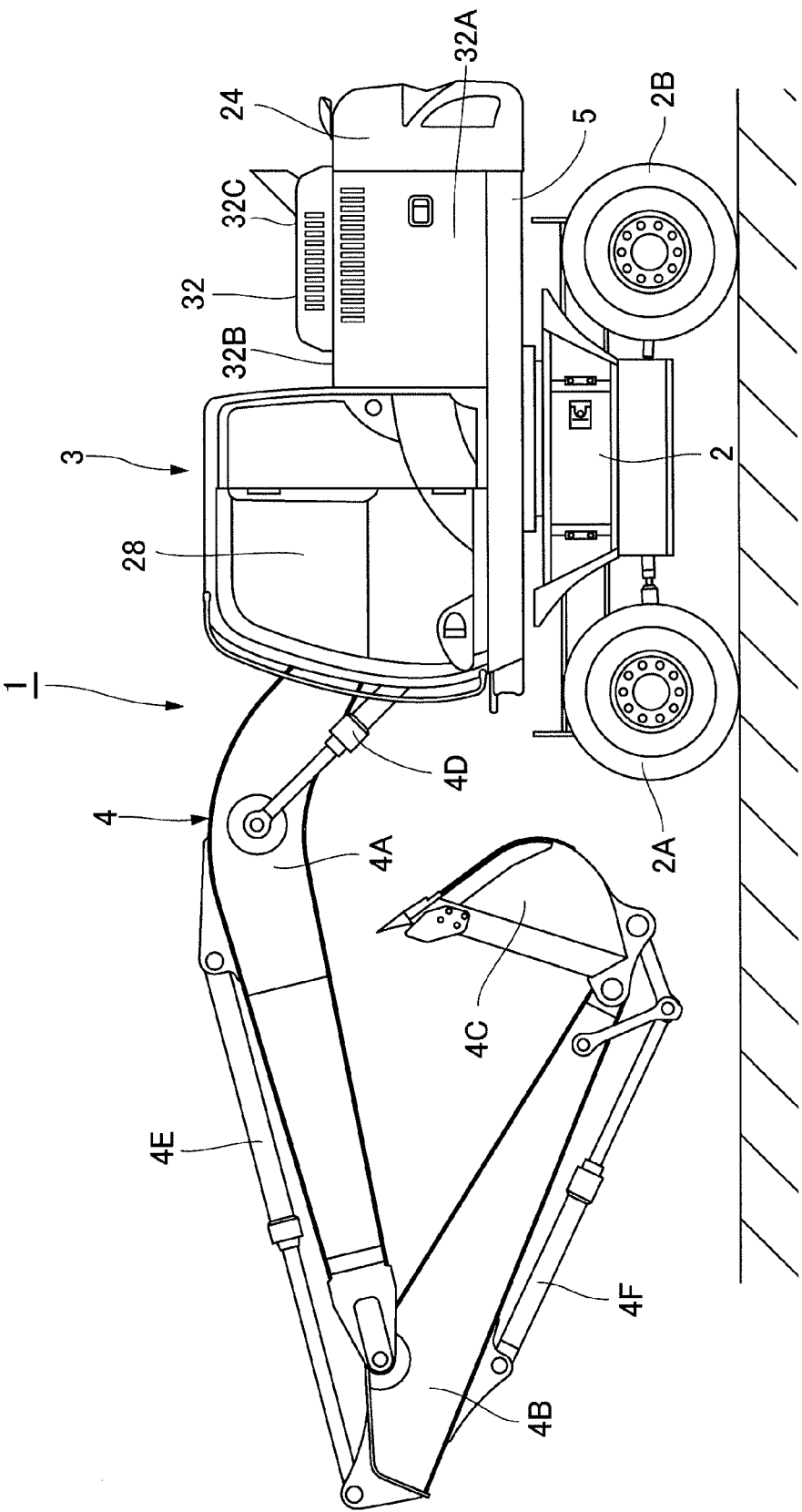
FIG. 1 is a front view showing a wheel type hydraulic excavator according to an embodiment of the present invention.

In FIG. 1, a wheel type hydraulic excavator 1 is a representative example of a construction machine according to the present embodiment. The wheel type hydraulic excavator 1 is configured of an automotive wheel type lower traveling structure 2 with left and right front wheels 2A and left and right rear wheels 2B, an upper revolving structure 3 that is rotatably mounted on the lower traveling structure 2 thereon and a front device 4 that is tiltably mounted on a front part of the upper revolving structure 3.

The front device 4 is provided in a front side of a revolving frame 5, which will be described later, to be capable of lifting and tilting thereto, thereby performing an excavating operation of earth and sand, and the like. The front device 4 includes a boom 4A that is mounted in a front side portion of left and right vertical plates 7, 8 in the revolving frame 5 to be capable of lifting and tilting thereto, an arm 4B that is mounted in a front end part of the boom 4A to be capable of lifting and tilting thereto and a bucket 4C that is mounted in a front end part of the arm 4B to be capable of rotating thereto, and further, a boom cylinder 4D, an arm cylinder 4E and a bucket cylinder 4F that drive the above components respectively.

In addition, the upper revolving structure 3 includes the revolving frame 5, a counterweight 24, an engine 25, a heat exchanger 26, a cab 28, a NOx purifying device 33 and a urea water tank 34, which will be described later.

Figure 2:
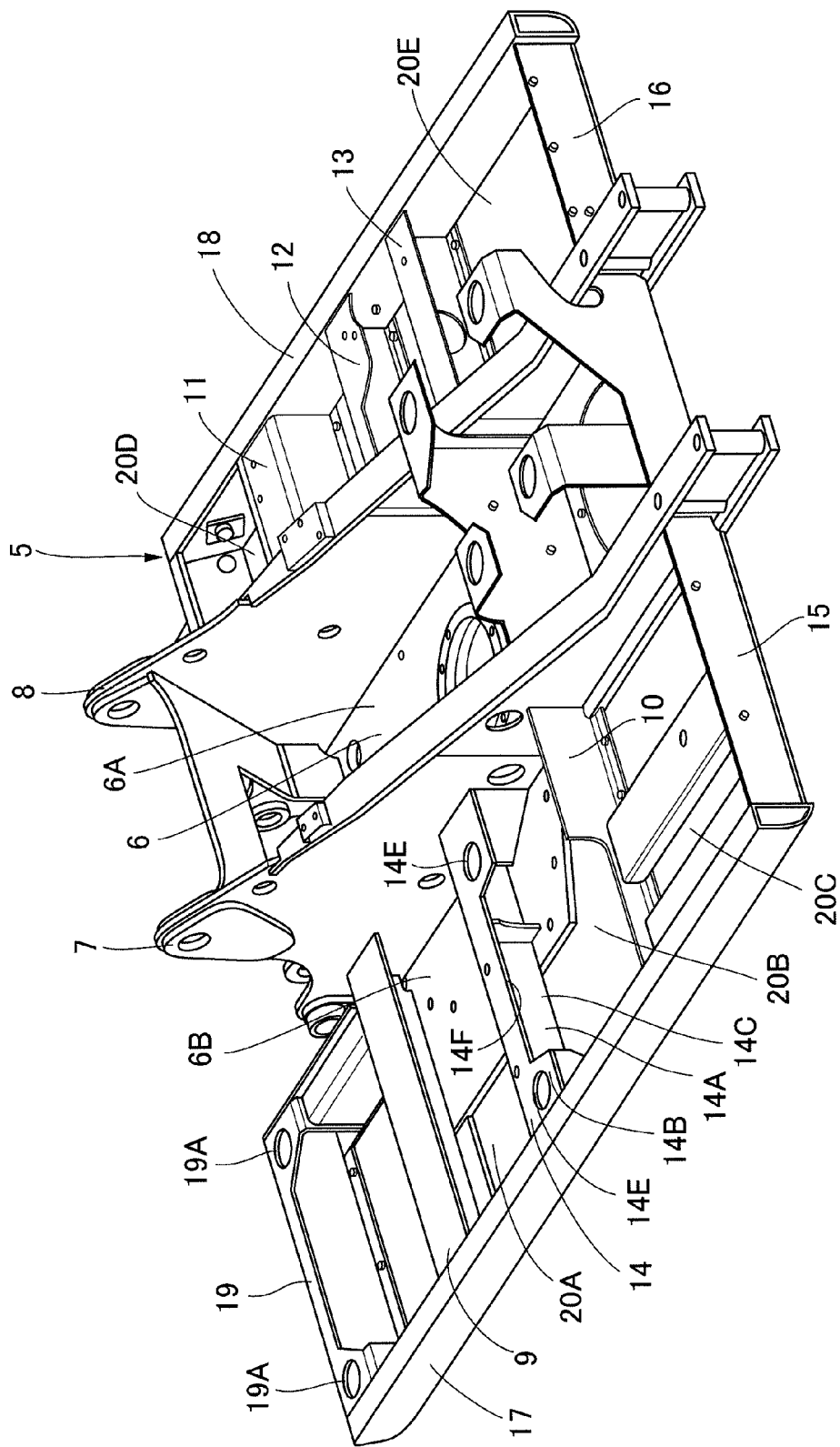
FIG. 2 is a perspective view showing a revolving frame as a single unit.
Figure 3:
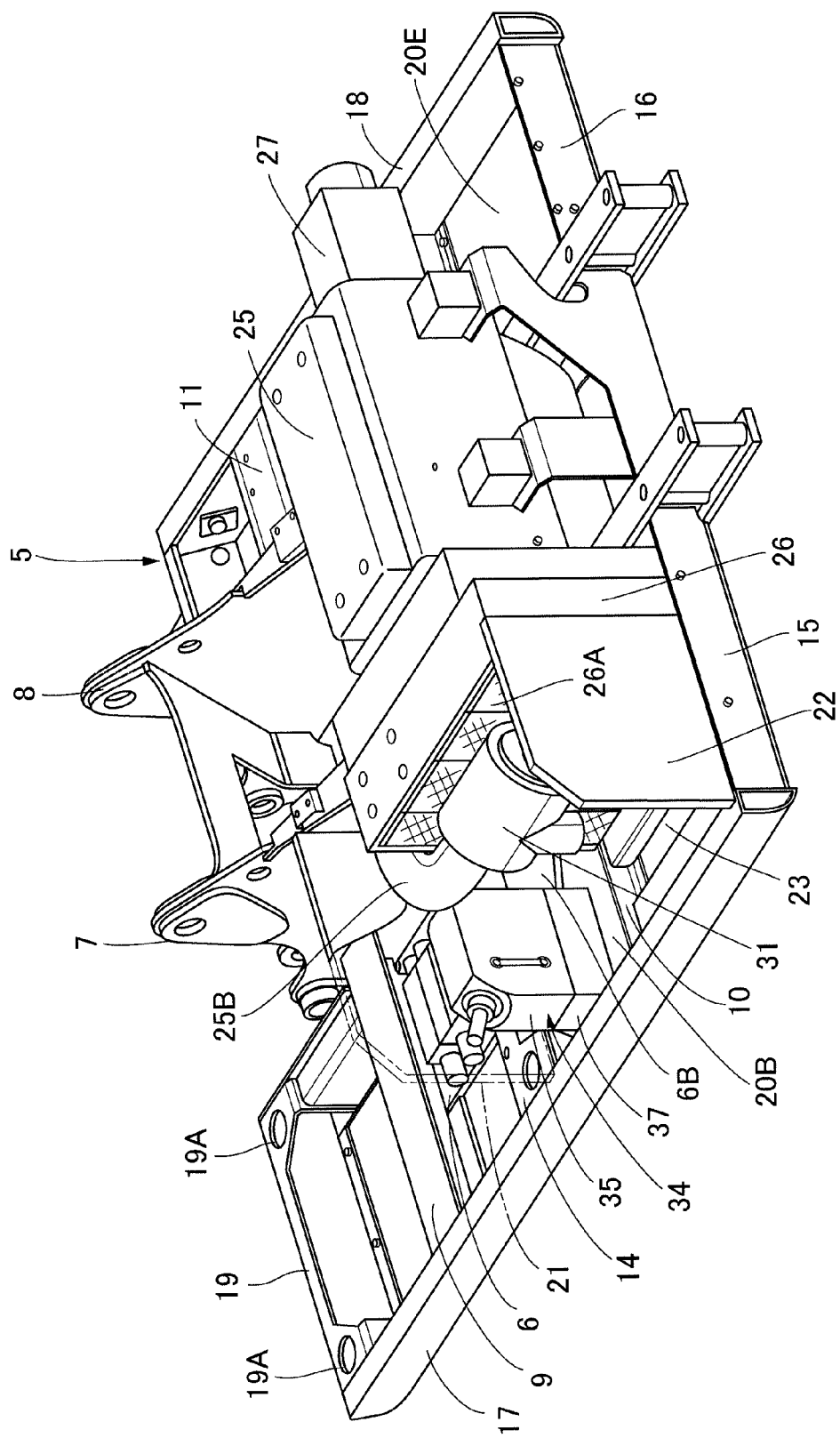
FIG. 3 is a perspective view showing a state where an engine, a heat exchanger, a urea water tank and the like are mounted on the revolving frame.

The revolving frame 5 is configured as a support structure of the upper revolving structure 3. As shown in FIG. 2, the revolving frame 5 includes a flat bottom plate 6, a left vertical plate 7 and a right vertical plate 8 that are provided vertically on the bottom plate 6 at an interval in a left-right direction and extend in a front-rear direction, a plurality of extension beams 9 to 13 and a single cab rear extension beam 14 that extend outside in the left-right direction from the bottom plate 6 and the respective vertical plates 7, 8, a left rear part plate 15 and a right rear part plate 16 that extend outside in the left-right direction from rear part positions from the respective vertical plates 7, 8, and a left side frame 17 and a right side frame 18 that are mounted in front ends of the respective extension beams 9 to 14 and the respective rear part plates 15, 16 and extend in the front-rear direction in outside positions of the bottom plate 6 in the left-right direction.

Figure 4:
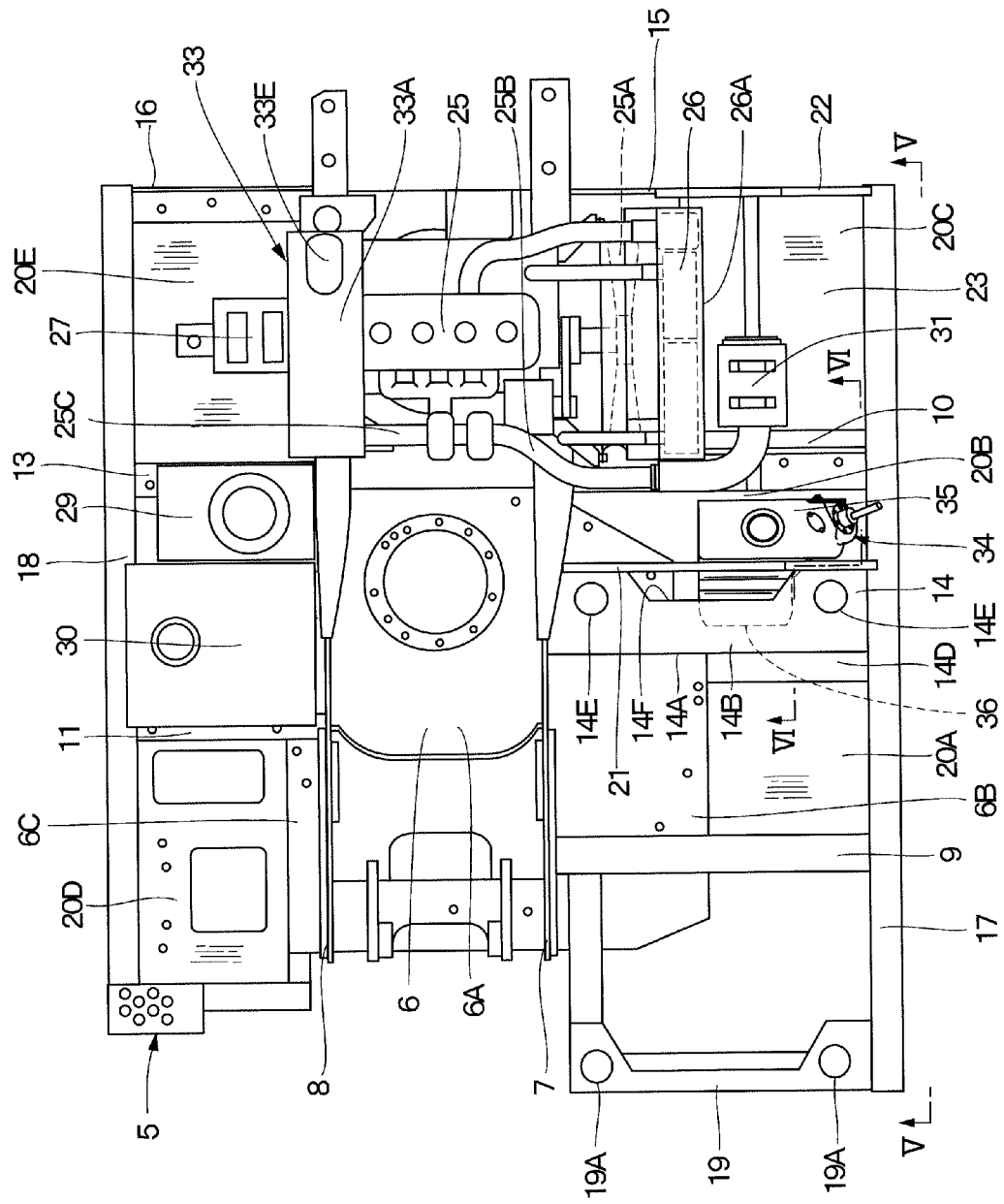
FIG. 4 is a plan view showing a state where the engine, the heat exchanger, the urea water tank and the like are mounted on the revolving frame.
Figure 5:
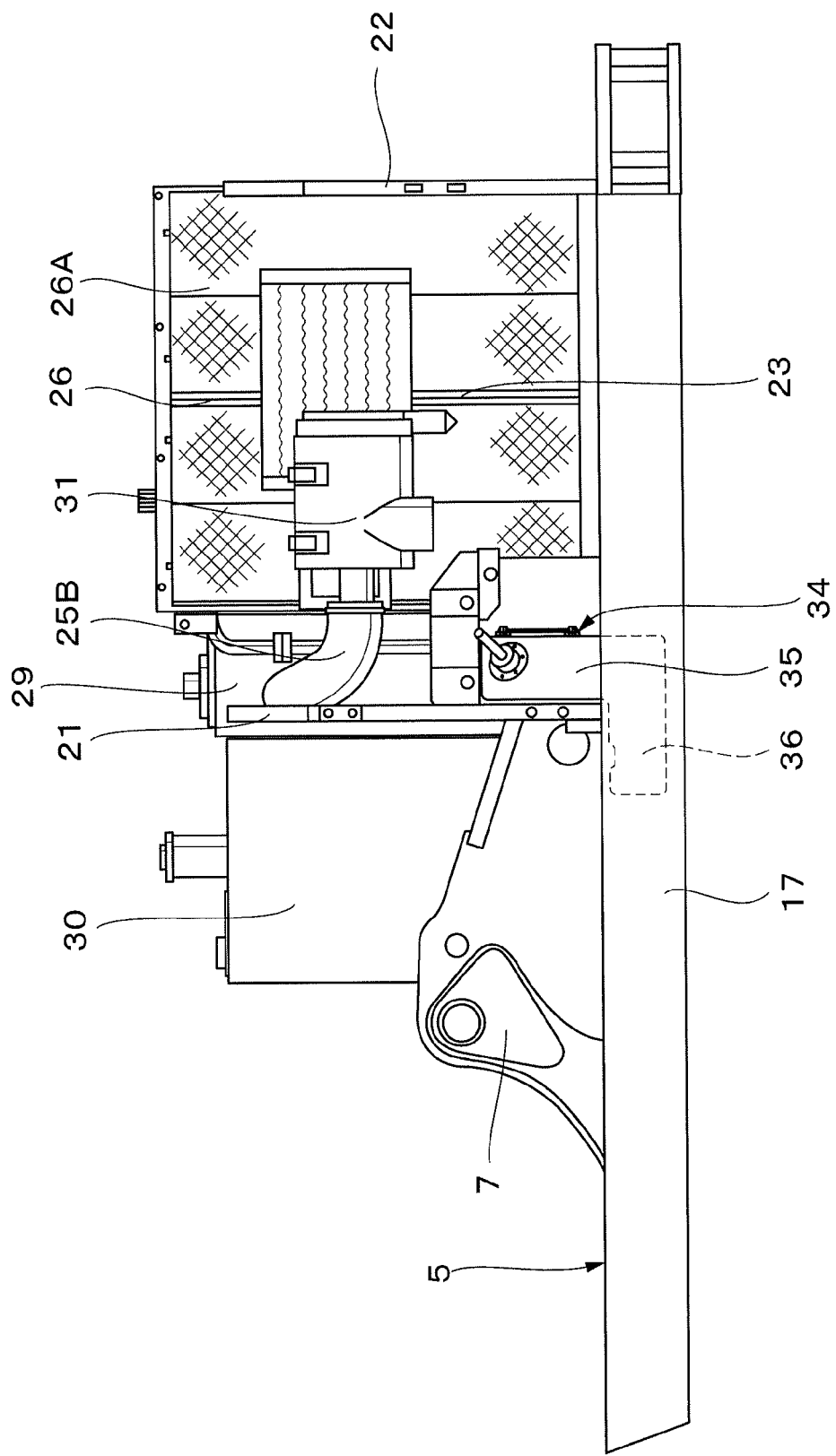
FIG. 5 is a front view showing the revolving frame and the like, viewed in a direction of arrows V-V in FIG. 4.

A cab front frame 19 is provided in a left front side of the revolving frame 5 to support a front side of a cab 28, and the cab front frame 19 is mounted on the bottom plate 6 to extend from a front end of the left side frame 17 to the right side (left vertical plate 7 side). On the other hand, as shown in FIG. 4, the bottom plate 6 includes a center plate part 6A that is positioned between the respective vertical plates 7, 8, a left plate part 6B that extends in the left side in the left-right direction (hereinafter, simply referred to as "left side") over the left vertical plate 7, and a right plate part 6C that extends in the right side in the left-right direction (hereinafter, simply referred to as "right side") over the right vertical plate 8.

Further, the extension beams 9, 10 and the cab rear extension beam 14 that are positioned in the left side among the plurality of extension beams 9 to 14, and the left rear part plate 15 are provided in a parallel lining state for connection between the left plate part 6B of the bottom plate 6, the left vertical plate 7 and the left side frame 17. On the other hand, the extension beams 11 to 13 and the right rear part plate 16 that are positioned in the right side are provided in a parallel lining state for connection between the right plate part 6C of the bottom plate 6, the right vertical plate 8 and the right side frame 18.

Figure 6:
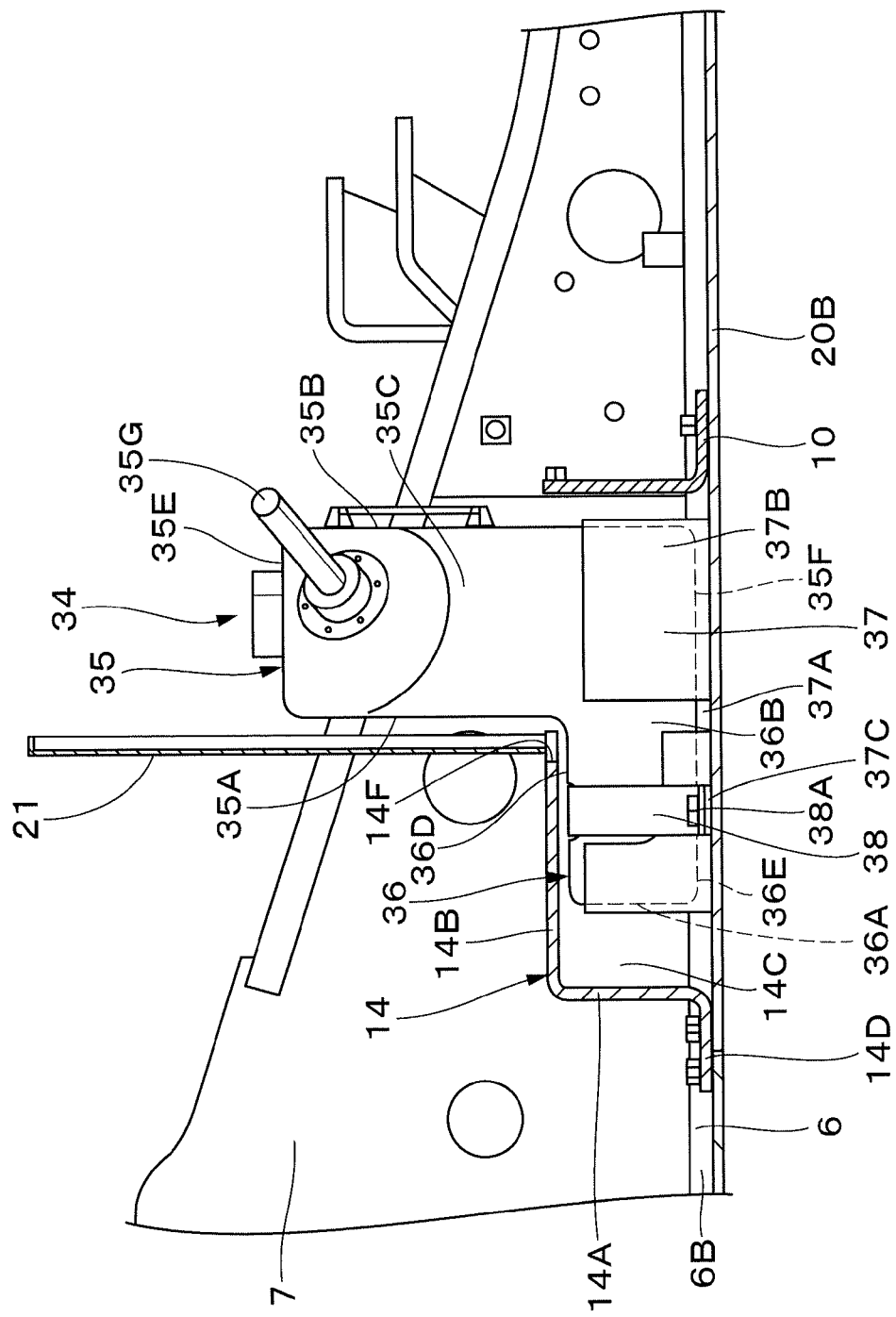
FIG. 6 is an enlarged cross section of an essential part showing a mounting structure of a urea water tank to the revolving frame, viewed in a direction of arrows VI-VI in FIG. 4.
Figure 7:
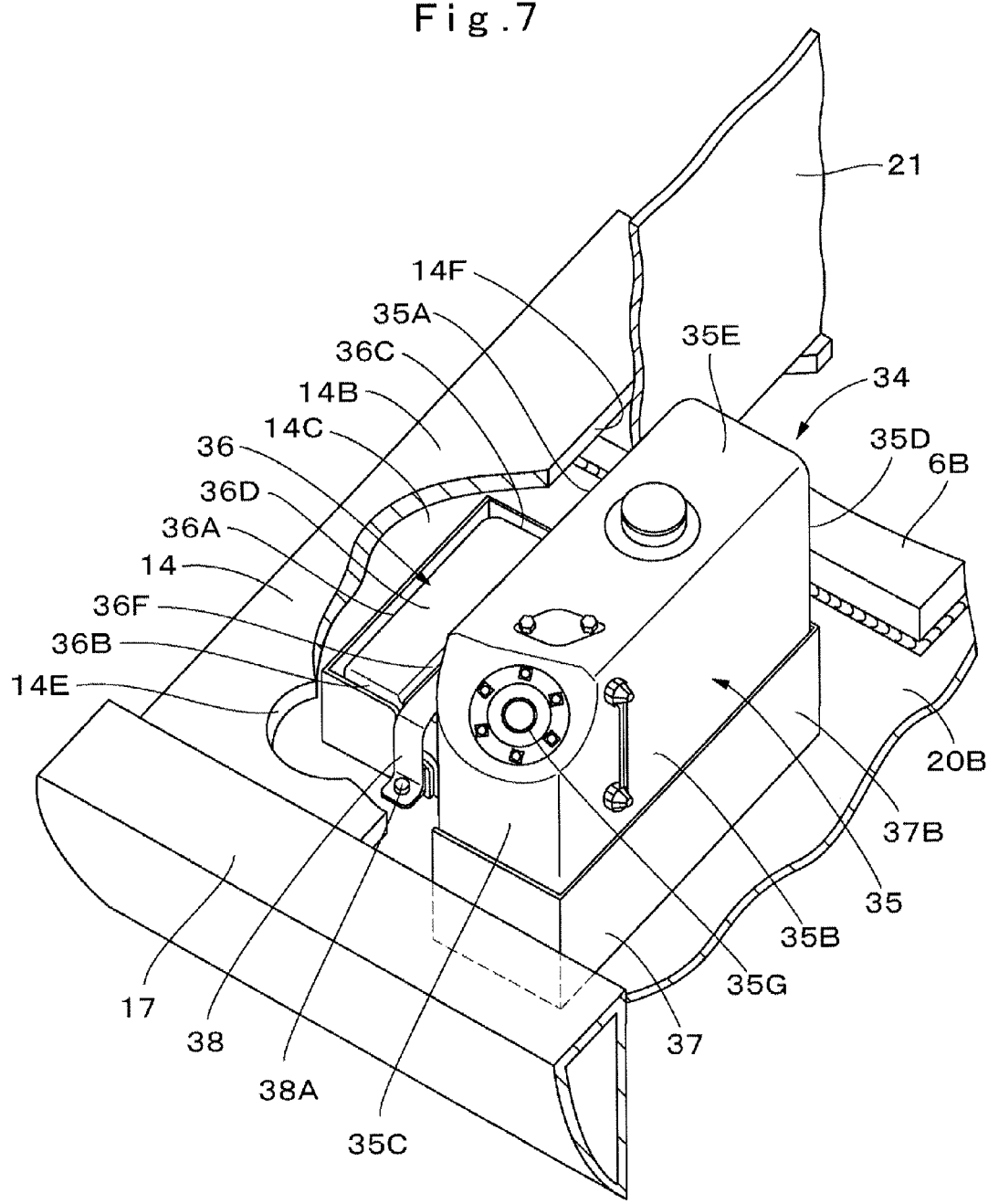
FIG. 7 is an enlarged perspective view of an essential part showing a mounting structure of the urea water tank to the revolving frame from a left oblique rear side.
Figure 8:
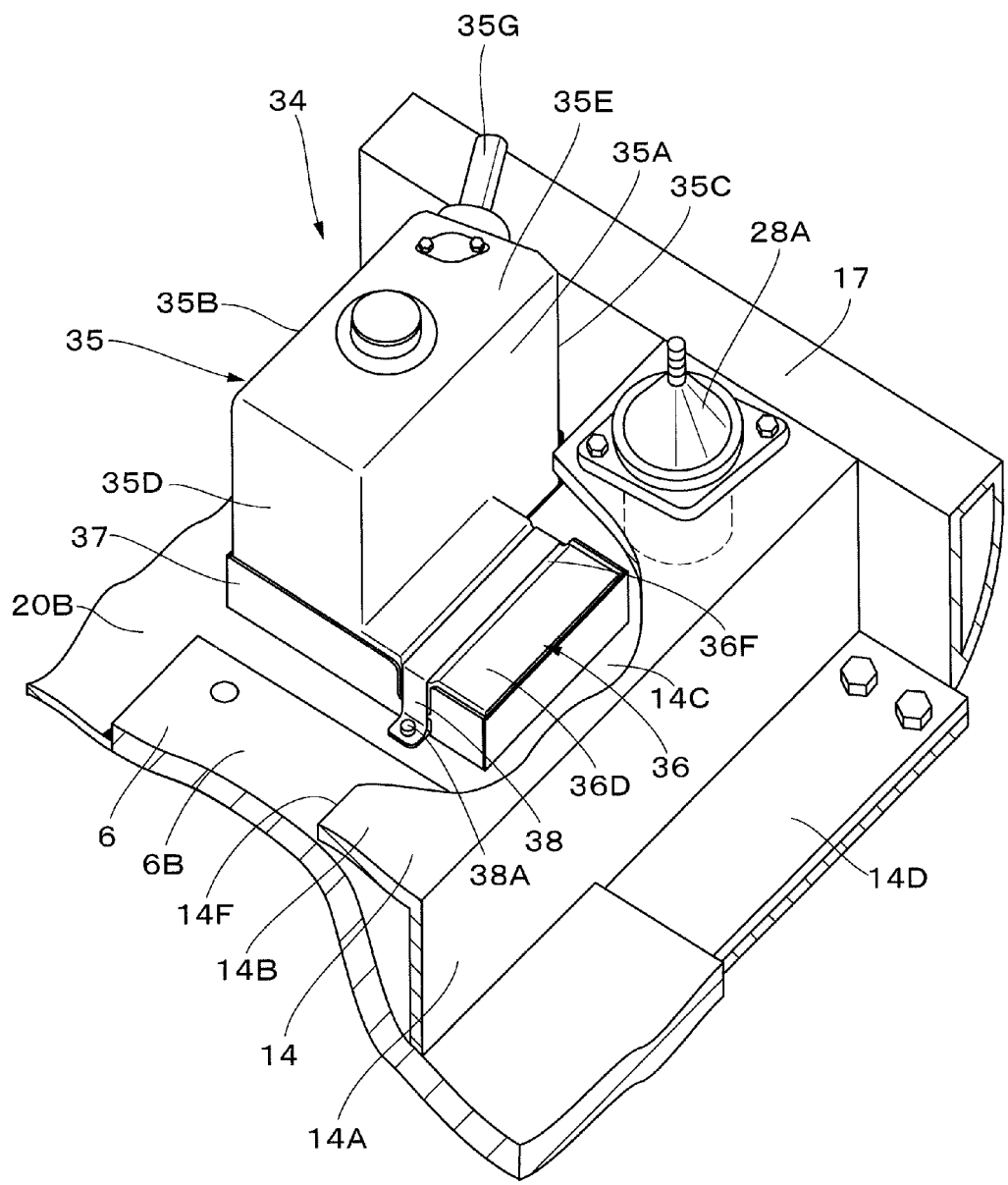
FIG. 8 is an enlarged perspective view of an essential part showing a mounting structure of the urea water tank to the revolving frame from a right oblique front side.

Here, the cab rear extension beam 14 is disposed in an intermediate part of the front-rear direction to be positioned in the left side of the revolving frame 5. The cab rear extension beam 14 is positioned in a front side to the heat exchanger 26 which will be described later to support a rear side of the cab 28. As shown in FIG. 6 and FIG. 8, the cab rear extension beam 14 is formed with a rising plate part 14A that extends in the left-right direction and rises from the left plate part 6B of the bottom plate 6, a flat upper horizontal plate part 14B that is bent form an upper end of the rising plate part 14A and extends to the rear side, and a space part 14C that is formed between the rising plate part 14A and the upper horizontal plate part 14B. Therefore, the cab rear extension beam 14 is formed in a reverse L-letter shape as a whole.

As shown in FIG. 6, the cab rear extension beam 14 is provided with a lower plate part 14D that is positioned between the bottom plate 6 and the left side frame 17 and extends forward from a lower end of the rising plate part 14A. Mount fixing holes 14E are provided respectively in both sides of the upper horizontal plate part 14B in the left-right direction. The two mount fixing holes 14E respectively are formed as round holes for mounting vibration isolating mounts 28A that support the cab 28 in a vibration isolating state.

A base end side (right side) of the cab rear extension beam 14 is jointed to the left plate part 6B of the bottom plate 6 and a side surface of the left vertical plate 7 by means of welding and the like, and a front end side (left side) thereof is jointed to an inner side surface of the left side frame 17 by means of welding and the like. That is, the cab rear extension beam 14 supports the rear side of the cab 28, and is used for connection between the bottom plate 6, the left vertical plate 7 and the left side frame 17.

On the other hand, the aforementioned cab front frame 19 is provided with mount fixing holes 19A that are positioned respectively in both sides of the left-right direction. The two mount fixing holes 19A respectively are provided with the vibration isolating mounts 28A. As shown in FIG. 4, the upper horizontal plate part 14B of the cab rear extension beam 14 is provided with a notched portion 14F formed by notching the upper horizontal plate part 14B between the left and right mount fixing holes 14E from the rear side. The notched portion 14F serves for insertion of various hoses and harnesses extending from the cab 28, and the like, and for the weight reduction.

A plurality of undercovers 20A to 20E are respectively disposed between the bottom plate 6 and the left and right side frames 17, 18 (hereinafter, referring to the respective undercovers 20A to 20E as "undercover 20" as a whole). The undercover 20 is made of a thin-plate shaped steel plate, and is jointed to the bottom plate 6, the respective extension beams 9 to 14, the respective side frames 17, 18 and the like by means of welding, bolts and the like. The urea water tank 34 which will be described later is mounted on an upper surface of the undercover 20B that is positioned in a lower side to the cab rear extension beam 14 among the respective undercovers 20.

A front partition plate 21 is provided on an upper surface of the upper horizontal plate part 14B in the cab rear extension beam 14. The front partition plate 21 is formed as a plate-shaped member that rises from the upper horizontal plate part 14B along a rear surface of the cab 28 and extends in the left-right direction. A front end of an upper surface cover 32B of an exterior cover 32 which will be described later is supported on an upper end of the front partition plate 21.

A rear partition plate 22 is disposed to face the front partition plate 21. The rear partition plate 22 is formed as a plate-shaped member that rises from the left rear part plate 15 among the left and right rear part plates 15, 16 and extends in the left-right direction. A rear end of the upper surface cover 32B of the exterior cover 32 is similarly supported on an upper end of the rear partition plate 22.

Further, a utility room 23 is provided between the front partition plate 21 and the rear partition plate 22. The utility room 23 is disposed outward of the revolving frame 5 in the left-right direction, that is, in a suction surface 26A side of the heat exchanger 26 which will be described later. An air cleaner 31 and a urea water tank 34, which will be described later, and the like are disposed in the utility room 23.

A counterweight 24 is provided in a rear part of the revolving frame 5. The counterweight 24 is mounted on rear end parts of the left and right vertical plates 7, 8 forming the revolving frame 5, and acts as a weight balance to the front device 4.

An engine 25 is provided on the revolving frame 5 to be positioned in a front side to the counterweight 24. As shown in FIG. 4, the engine 25 is mounted on the revolving frame 5 in a horizontal state of extending in the left-right direction. A cooling fan 25A is disposed in a left side to the engine 25. The engine 25 is configured, for example, as a diesel engine and serves as a drive source for rotating and driving a hydraulic pump 27 which will be described later. Further, the engine 25 is provided with an intake pipe 25B for sucking air and an exhaust pipe 25C for discharging an exhaust gas. An air cleaner 31 which will be described later is connected to the intake pipe 25B, and a NOx purifying device 33 which will be described later is connected to the exhaust pipe 25C.

The heat exchanger 26 is disposed at the left side in the length direction to the engine 25, that is, in the utility room 23 side. The heat exchanger 26 accommodates a radiator for cooling engine-cooling water, an oil cooler for cooling operating oil, an intercooler for cooling air to be aspired into the engine 25 and the like inside a frame-shaped member. Here, the heat exchanger 26 sucks outside air as cooling wind from the outside (left side) in the left-right direction, and is provided with a suction surface 26A as a surface at the opposite to the cooling fan 25A. The suction surface 26A forms a part of a closing surface for closing the right side of the utility room 23.

A hydraulic pump 27 is mounted in the right side to the engine 25. The hydraulic pump 27 is rotated and driven by the engine 25 to deliver the operating oil as pressurized oil. The hydraulic pump 27 is formed of, for example, a radial piston hydraulic pump of a swash plate type or a bent axis type and the like.

The cab 28 is mounted on the revolving frame 5 to be positioned in the front side to the heat exchanger 26. The cab 28 in which an operator gets accommodates therein the operator's seat on which the operator sits, a traveling operating lever, a working operating lever, and the like (none is shown). The cab 28 has a front side that is supported by the cab front frame 19 of the revolving frame 5 and a rear side that is supported by the cab rear extension beam 14. In this case, the cab 28 is supported at four corners thereof by the four vibration isolating mounts 28A (only one is shown in FIG. 8) inserted in the respective mount fixing holes 19A of the cab front frame 19 and the mount fixing holes 14E of the cab rear extension beam 14 respectively.

A hydraulic oil tank 29 is provided in the right side of the revolving frame 5 to be positioned forward of the hydraulic pump 27. The hydraulic oil tank 29 reserves operating oil to be supplied to the hydraulic pump 27. In addition, a fuel tank 30 is provided to be adjacent to the front side of the hydraulic oil tank 29. The fuel tank 30 reserves fuel to be supplied to the engine 25.

The air cleaner 31 is disposed in the utility room 23 to be positioned upstream of the heat exchanger 26. The air cleaner 31 separates dusts in the aspired air by centrifugation, and circulates only the cleansed air into the engine 25 side.

The exterior cover 32 is provided on the revolving frame 5 to be positioned between the cab 28 and the counterweight 24. The engine 25, the heat exchanger 26, the hydraulic pump 27, the NOx purifying device 33 and the like are accommodated in the exterior cover 32. The exterior cover 32 includes a left surface cover 32A that is provided to extend upward on the left side frame 17 to face the heat exchanger 26, a right surface cover (not shown) that is provided to extend upward on the right side frame 18 to face the hydraulic pump 27, an upper surface cover 32B that extends in the left-right direction across an upper part of each of the side surface covers 32A and an engine cover 32C mounted on the upper surface cover 32B to be capable of opening/closing. Here, the left surface cover 32A covers the left side of the utility room 23 to be capable of opening/closing, and can cause the urea water tank 34 to be exposed to outside in the opened state.

Next, an explanation will be made of the configuration of the NOx purifying device 33 that is provided to be connected to an exhaust side of the engine 25 for treating an exhaust gas emitted from the engine 25.

Figure 10:
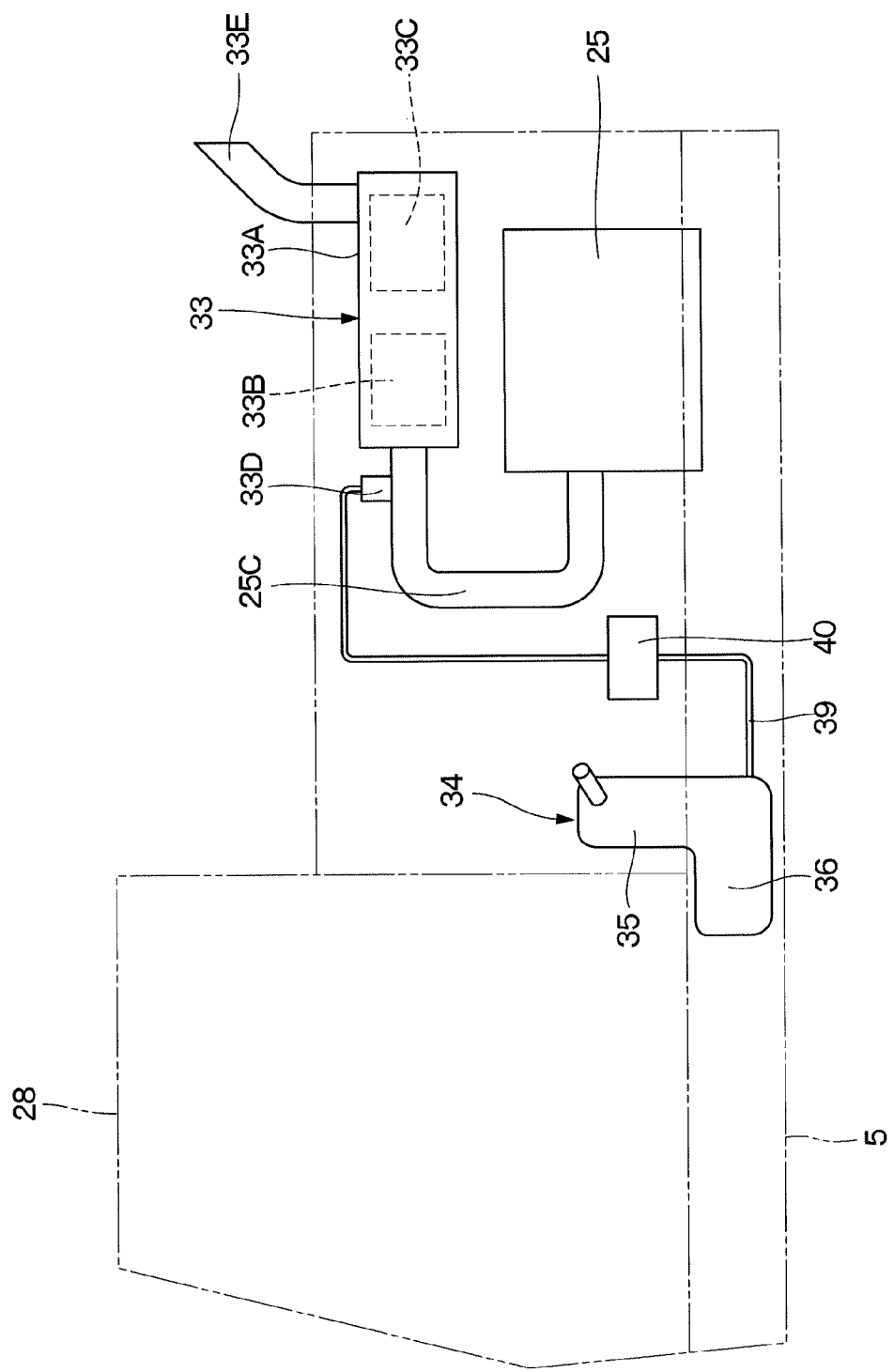

The NOx purifying device 33 is disposed in the right upper side to the engine 25. The NOx purifying device 33 is provided in the exhaust pipe 25C of the engine 25. As shown in FIG. 10, the NOx purifying device 33 includes a cylindrical case 33A that is formed as a cylindrical vessel extending in the front-rear direction, a urea selective reduction catalyst 33B that is provided in the upstream side in the cylindrical case 33A, an oxidation catalyst 33C that is disposed in the cylindrical case 33A to be positioned downstream of the urea selective reduction catalyst 33B and a urea water injection valve 33D that is provided in the exhaust pipe 25C of the engine 25 upstream of the urea selective reduction catalyst 33B. A tail pipe 33E is provided to project upward on the rear side in the cylindrical case 33A.

The NOx purifying device 33 thus configured ejects urea water supplied from the urea water tank 34 which will be described later into the exhaust gas from the urea water injection valve 33D. As a result, the urea selective reduction catalyst 33B uses ammonia generated from the urea water to cause reduction reaction of NOx (nitrogen oxides) in the exhaust gas, which is decomposed into water and nitrogen. Then, carbon oxides (CO), hydrocarbon (HC) and the like in the exhaust gas become oxidized by the oxidation catalyst 33C for removal.

Next, an explanation will be made of the configuration and mounting structure of the urea water tank 34 that is a characteristic part in the present invention.

The urea water tank 34 is provided on the revolving frame 5 to be positioned in a rear side to the cab 28. The urea water tank 34 reserves urea water to be supplied to the urea water injection valve 33D in the NOx purifying device 33. The urea water tank 34 is formed of a vertical tank part 35 that is positioned in the rear side and extends in the upper-lower direction, and a lateral tank part 36 that extends from a lower part of the vertical tank part 35 to the front side. As a result, the urea water tank 34 is formed in an L-letter shape as a whole.

The vertical tank part 35 in the urea water tank 34 is formed in a cuboid shape extending in the upper-lower direction. That is, as shown FIG. 7 to FIG. 9, the vertical tank part 35 is formed of, for example, a front surface plate 35A, a rear surface plate 35B, a left surface plate 35C, a right surface plate 35D, an upper surface plate 35E and a lower surface plate 35F. A water supply port 35G for supplying urea water is provided in an upper part position of the vertical tank part 35, that is, in a boundary position between the left surface plate 35C and the upper surface plate 35E to be inclined outside in the left-right direction. The vertical tank part 35 thus formed is disposed at the front side position in the utility room 23, specifically near the front partition plate 21.

The lateral tank part 36 is formed in a cuboid shape laterally (horizontal direction) extending from a lower part of the front surface plate 35A in the vertical tank part 35 to the front side. That is, the lateral tank part 36 is formed of, for example, a front surface plate 36A, a left surface plate 36B, a right surface plate 36C, an upper surface plate 36D and a lower surface plate 36E. The upper surface plate 36D is provided with a recessed groove-shaped belt mounting groove 36F extending in the left-right direction.

Here, as shown in FIG. 8, the lateral tank part 36 is disposed in a position closer to the right side (left vertical plate 7 side) relative to the vertical tank part 35. Therefore, even in a case where the vertical tank part 35 is disposed near the left side frame 17, the lateral tank part 36 can be disposed in a position of avoiding each of the mount fixing holes 14E in a plan view, that is, each of the vibration isolating mounts 28A. As a result, the urea water tank 34 can be disposed in an outside position (near the left side frame 17) where the water supply work and the maintenance work are easily performed without interference with each of the vibration isolating mounts 28A.

Figure 9:
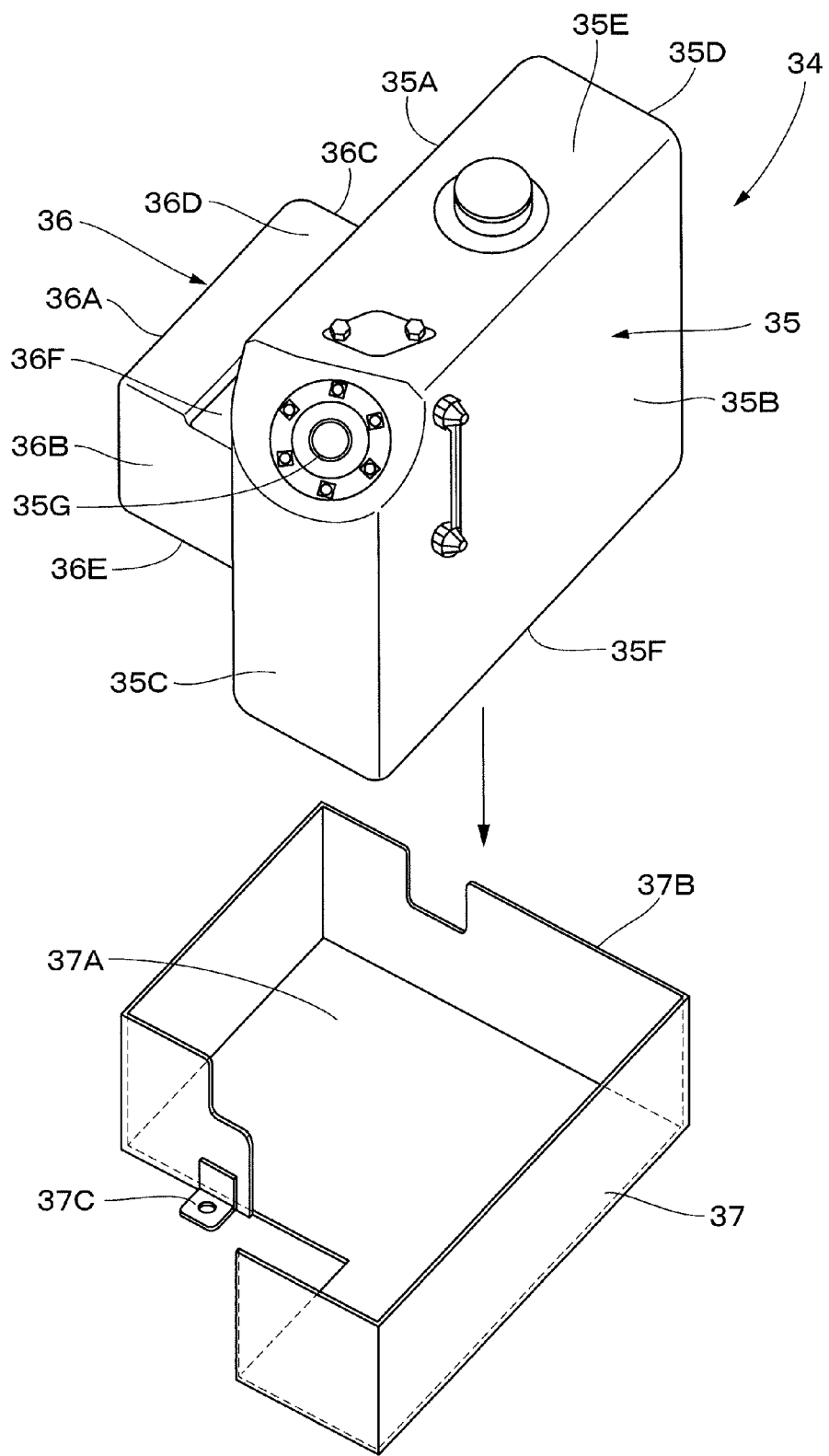
FIG. 9 is an exploded perspective view showing a state where the urea water tank and a tank receiver are exploded.

A tank receiver 37 is provided in a bottom part side of the urea water tank 34. As shown in FIG. 9, the tank receiver 37 is formed of an L-letter shaped bottom part 37A a left front side of which is notched, and a frame part 37B rising from the periphery of the bottom part 37A. The frame part 37B is provided with brackets 37C in a position of interposing the lateral tank part 36 in the left-right direction therebetween.

Next, description will be made of an example of the procedure of mounting the urea water tank 34 thus configured on the undercover 20B. The urea water tank 34 accommodated in the tank receiver 37 is disposed in the utility room 23. In this case, the space part 14C provided in the cab rear extension beam 14 is used to accommodate the lateral tank part 36 in the space part 14C. In this state, a fixing belt 38 as a fixing tool is engaged to the belt mounting groove 36F of the lateral tank part 36, and bolts 38A are used to fix both ends of the fixing belt 38 together with the bracket 37C of the tank receiver 37 on the undercover 20B. As a result, the urea water tank 34 can be mounted integrally on the undercover 20B in a state of being positioned along a rear surface of the cab 28.

Here, as shown in FIG. 10, the urea water tank 34 is connected to the urea water injection valve 33D in the NOx purifying device 33 via a urea water supply pipe 39 and a supply pump 40.

In addition, the urea water tank 34 can be disposed in the outside position in the left-right direction within easy reach from the surroundings even in the utility room 23. Therefore, by opening the left surface cover 32A of the exterior cover 32, a refilling work of urea water and a maintenance work such as inspections and repair and the like can be easily performed.

The wheel type hydraulic excavator 1 as the construction machine according to the present embodiment has the aforementioned configuration. Next, an explanation will be made of an operation of the wheel type hydraulic excavator 1.

An onboard operator in the cab 28 starts the engine 25 to drive the hydraulic pump 27. As a result, the front device 4 is driven in response to an operation of the operating lever (not shown) by the operator, thus making it possible to perform an excavating operation of earth and sand, and the like.

In addition, nitrogen oxides (NOx) as harmful substances are discharged from the exhaust pipe 25C at the operating of the engine 25. At this time, the supply pump 40 is used to deliver urea water in the urea water tank 34 to the urea water injection valve 33D in the NOx purifying device 33 from the urea water supply pipe 39. Thereby, the NOx purifying device 33 ejects urea water into the exhaust gas from the urea water injection valve 33D to generate ammonia. As a result, in the urea selective reduction catalyst 33B, the nitrogen oxide is reduced to water and nitrogen, which are discharged to outside via the oxidation catalyst 33C and the tail pipe 33E, thus making it possible to reduce an exhaust amount of the nitrogen oxides.

Thus, according to the present embodiment, since the urea water tank 34 is formed in an L-letter shaped vessel with the vertical tank part 35 and the lateral tank part 36, the volume of the urea water tank 34 can be increased by a size of the lateral tank part 36. In this case, using the space part 14C of the cab rear extension beam 14 formed in a reverse L-letter shape by the rising plate part 14A and the upper horizontal plate part 14B, the lateral tank part 36 of the L-letter shaped urea water tank 34 can be disposed in the space part 14C. As a result, even in case where a space for installing the urea water tank 34 is small, the volume of the urea water tank 34 can be increased using the space part 14C as a dead space.

Since the urea water tank 34 can suppress an occupation space in the utility room 23 to be small by using the dead space, degrees of freedom in the arrangement location can be increased. Thereby, the urea water tank 34 can be disposed in the outside position in the left-right direction within easy reach from outside, improving workability of a water supply work of urea water, a maintenance work of the urea water tank and the like.

Since the utility room 23 is disposed in the suction surface 26A side from which the heat exchanger 26 sucks outside air, that is, in the outside position in the left-right direction, an operator can easily reach the vertical tank part 35 in the urea water tank 34 disposed in the utility room 23, from outside. Therefore, the workability of a water supply work to the urea water tank 34, a maintenance work of the urea water tank 34 and the like can be improved.

The lateral tank part 36 in the urea water tank 34 is disposed in a position closer to the right side relative to the vertical tank part 35. Therefore, the lateral tank part 36 can be disposed in a position of avoiding the two mount fixing holes 14E formed on the upper horizontal plate part 14B of the cab rear extension beam 14, that is, each of the vibration isolating mounts 28A. As a result, the urea water tank 34 can be disposed in a position without interference with each of the vibration isolating mounts 28A disposed in the rear side to the cab 28.

The urea water tank 34 uses the fixing belt 38 as a fixing tool to be fixed on the undercover 20B between the bottom plate 6 and the left side frame 17 using the bolts 38A. Therefore, the urea water tank 34 can be provided on the undercover 20B of the revolving frame 5 to be easily removed from.

Further, the water supply port 35G of urea water is provided on the upper part position of the vertical tank part 35 in the urea water tank 34. Thereby, in a case of refilling urea water in the urea water tank 34, the water supply work can be easily performed only by opening the left surface cover 32A of the exterior cover 32.

Figure 11:
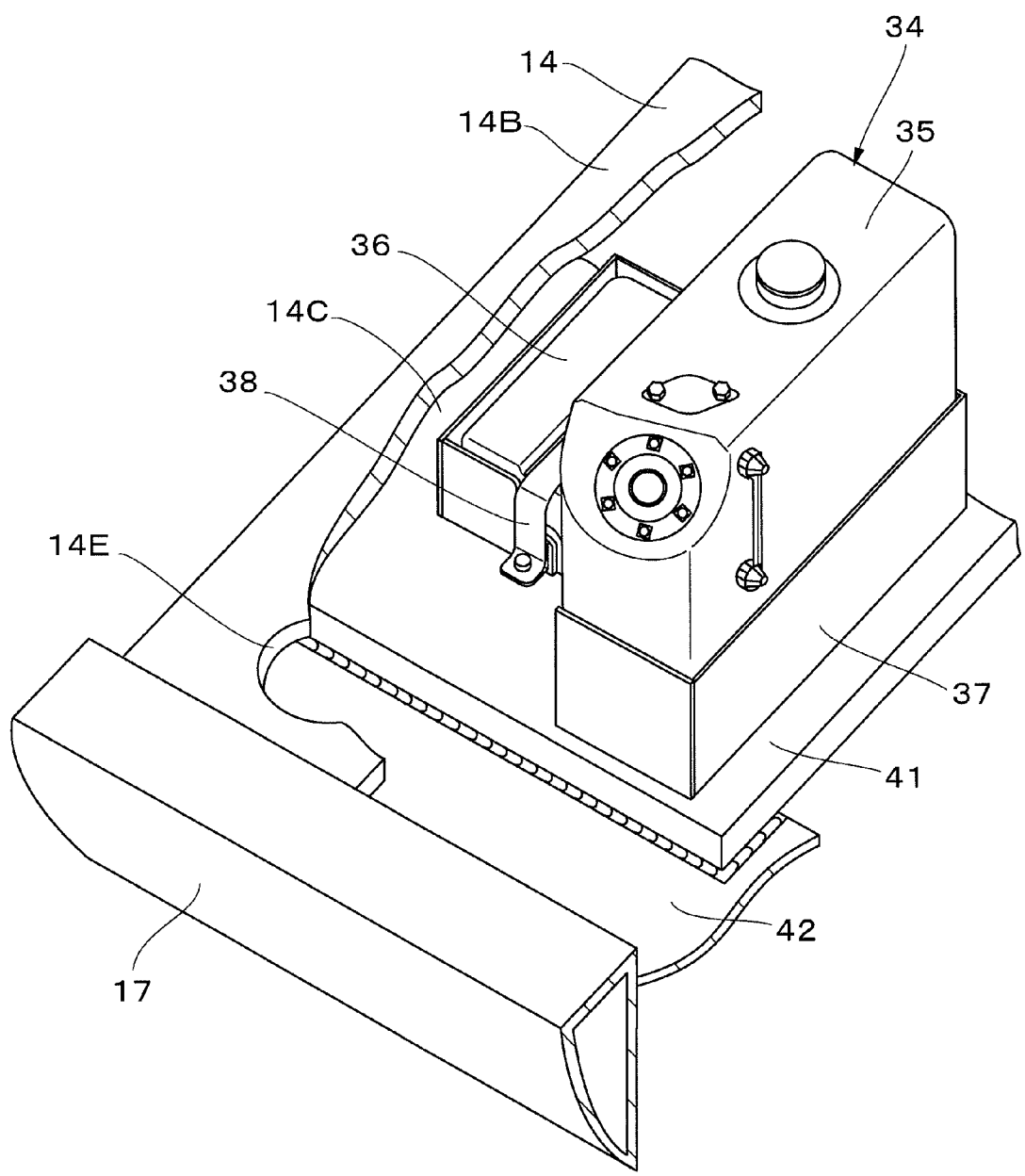
FIG. 11 is a partially enlarged perspective view of an essential part showing a modification in the present invention from a position similar to that of FIG. 7.

It should be noted that the present embodiment exemplifies a case where the urea water tank 34 is mounted on the undercover 20B disposed under the cab rear extension beam 14 of the revolving frame 5. However, the present invention is not limited thereto, and, for example, may be configured as a modification shown in FIG. 11. That is, in the modification shown in FIG. 11, a bottom plate 41 extends to a position near the left side frame 17, and the urea water tank 34 is mounted on the bottom plate 41. In this case, an undercover 42 is formed to be narrow in width to adjust to the bottom plate 41.

The present embodiment exemplifies a case where the urea water tank 34 is bolted on the undercover 20B using the fixing belt 38 as the fixing tool. However, the present invention is not limited thereto, and for example, it may be configured that the urea water tank 34 is directly bolted on the undercover 20B.

In the present embodiment, the lateral tank part 36 in the urea water tank 34 is disposed in a position closer to the right side relative to the vertical tank part 35. However, the present invention is not limited thereto, and, for example, the lateral tank part 36 may be formed to have a width dimension identical to that of the vertical tank part 35. Besides, as long as the urea water tank 34 is shaped to be accommodated in the dead space (space part 14C) in the utility room 23, the shape of the urea water tank 34 is not limited.

The present embodiment exemplifies a case where the urea water tank 34 is accommodated in the tank receiver 37. However, the present invention is not limited thereto, and, for example, it may be configured that the urea water tank 34 is directly mounted on the undercover 20B with the tank receiver 37 being eliminated.

In the present embodiment, the front and rear partition plates 21, 22 are provided in the upper side position of the upper horizontal plate part 14B of the cab rear extension beam 14 and in the rear end position of the left side frame 17 of the revolving frame 5 respectively. However, the present invention is not limited thereto, and may be configured to, for example, provide another partition plate between the urea water tank 34 and the heat exchanger 26.

The aforementioned embodiment exemplifies a case where the urea water tank 34 is provided in the wheel type hydraulic excavator 1. However, the present invention is not limited thereto, and may be applied to, for example, a crawler type hydraulic excavator. Further, the present invention is not limited to the hydraulic excavator, and may be applied to a hydraulic crane.

DESCRIPTION OF REFERENCE NUMERALS

1: Wheel type hydraulic excavator (Construction machine)
2: Lower traveling structure
3: Upper revolving structure
4: Front device
5: Revolving frame
6, 41: Bottom plate
7: Left vertical plate
8: Right vertical plate
9 to 13: Extension beam
14: Cab rear extension beam
14A: Rising plate part
14B: Upper horizontal plate part
14C: Space part
14E: Mount fixing hole
15: Left rear part plate
16: Right rear part plate
17: Left side frame
18: Right side frame
20A to 20E, 42: Undercover
21: Front partition plate
22: Rear partition plate
23: Utility room
24: Counterweight
25: Engine
25C: Exhaust pipe
26: Heat exchanger
26A: Suction surface
28: Cab
28A: Vibration isolating mount
33: NOx purifying device
33B: Urea selective reduction catalyst
33D: Urea water injection valve
34: Urea water tank
35: Vertical tank part
35G: Water supply port
36: Lateral tank part
38: Fixing belt (Fixing tool)

The invention claimed is:

1. A construction machine comprising:
an automotive lower traveling structure (2);
an upper revolving structure (3) that is rotatably mounted on said lower traveling structure (2); and
a front device (4) that is liftably mounted in a front part of said upper revolving structure (3), wherein
said upper revolving structure (3) includes a revolving frame (5) that is configured as a support structure, a counterweight (24) that is positioned in a rear side to said revolving frame (5) to act as a weight balance to said front device (4), an engine (25) that is disposed on said revolving frame (5) in a laterally-facing state to be positioned in a front side to said counterweight (24), a heat exchanger (26) that is provided to be positioned in one side of said engine (25) in a length direction, a cab (28) that is provided on said revolving frame (5) to be positioned in a front side to said heat exchanger (26), a NOx purifying device (33) that is mounted in an exhaust pipe (25C) of said engine (25) and is provided with a urea selective reduction catalyst (33B) for removing nitrogen oxides in an exhaust gas by injection of urea water from a urea water injection valve (33D), and a urea water tank (34) that reserves urea water therein for supply to said urea water injection valve (33D) in said NOx purifying device (33), wherein
said revolving frame (5) includes a flat bottom plate (6, 41), left and right vertical plates (7, 8) that are provided vertically on said bottom plate (6, 41) at an interval in a left-right direction to extend in a front-rear direction, a plurality of extension beams (9 to 14) that extend in the left-right direction from said bottom plate (6, 41) and said respective vertical plates (7, 8), and a left side frame (17) and a right side frame (18) that are mounted in front ends of said respective extension beams (9 to 14) to extend in the front-rear direction in outside positions of said bottom plate (6, 41) in the left-right direction, characterized in that:
a cab rear extension beam (14) that is positioned in a front side to said heat exchanger (26) to support a rear side of said cab (28) among the plurality of said extension beams (9 to 14), is formed in a reverse L-letter shape with a rising plate part (14A) that rises from said bottom plate (6, 41), an upper horizontal plate part (14B) that is bent from an upper end of said rising plate part (14A) and extends to the rear side, and a space part (14C) that is formed between said rising plate part (14A) and said upper horizontal plate part (14B);
said urea water tank (34) is formed in an L-letter shaped vessel with a vertical tank part (35) that extends in the upper-lower direction and a lateral tank part (36) that extends from a lower part of said vertical tank part (35) to the front side; and
said lateral tank part (36) in said urea water tank (34) is disposed in said space part (14C) formed in said cab rear extension beam (14).

2. The construction machine according to claim 1, wherein
a front partition plate (21) is provided on an upper surface of said upper horizontal plate part (14B) of said cab rear extension beam (14) to rise from said upper horizontal plate part (14B) and extend in the left-right direction, left and right rear part plates (15, 16) are provided between said left and right vertical plates (7, 8) and said left and right side frames (17, 18) respectively to extend in parallel to said extension beam (10, 13), a rear partition plate (22) that extends in the left-right direction is provided in said left rear part plate (15) of said left and right rear part plates (15, 16) to face said front partition plate (21), a utility room (23) is provided between said front partition plate (21) and said rear partition plate (22) to be positioned in a suction surface (26A) side where said heat exchanger (26) sucks outside air, and said vertical tank part (35) in said urea water tank (34) is disposed in a front side position of said utility room (23).

3. The construction machine according to claim 1, wherein said upper horizontal plate part (14B) in said cab rear extension beam (14) is provided with mount fixing holes (14E) positioned respectively in both sides of in the left-right direction to mount vibration isolating mounts (28A) that support said cab (28) in a vibration isolating state, and said lateral tank part (36) in said urea water tank (34) is disposed in a position of avoiding each of said mount fixing holes (14E) in a plan view.

4. The construction machine according to claim 1, wherein an undercover (20B) is provided in a lower side to said cab rear extension beam (14) to be positioned between said bottom plate (6) and said left side frame (17), and said urea water tank (34) is mounted on said undercover (20B) using a fixing tool (38).

5. The construction machine according to claim 1, wherein said vertical tank part (35) in said urea water tank (34) extends upward along a rear surface of said cab (28), and a water supply port (35G) of urea water is provided on an upper part position of said vertical tank part (35).

* * * * *